Sept. 15, 1959    H. WESSENDORF    2,904,116
TRACTOR IMPLEMENT HITCH
Filed May 21, 1956    2 Sheets-Sheet 1
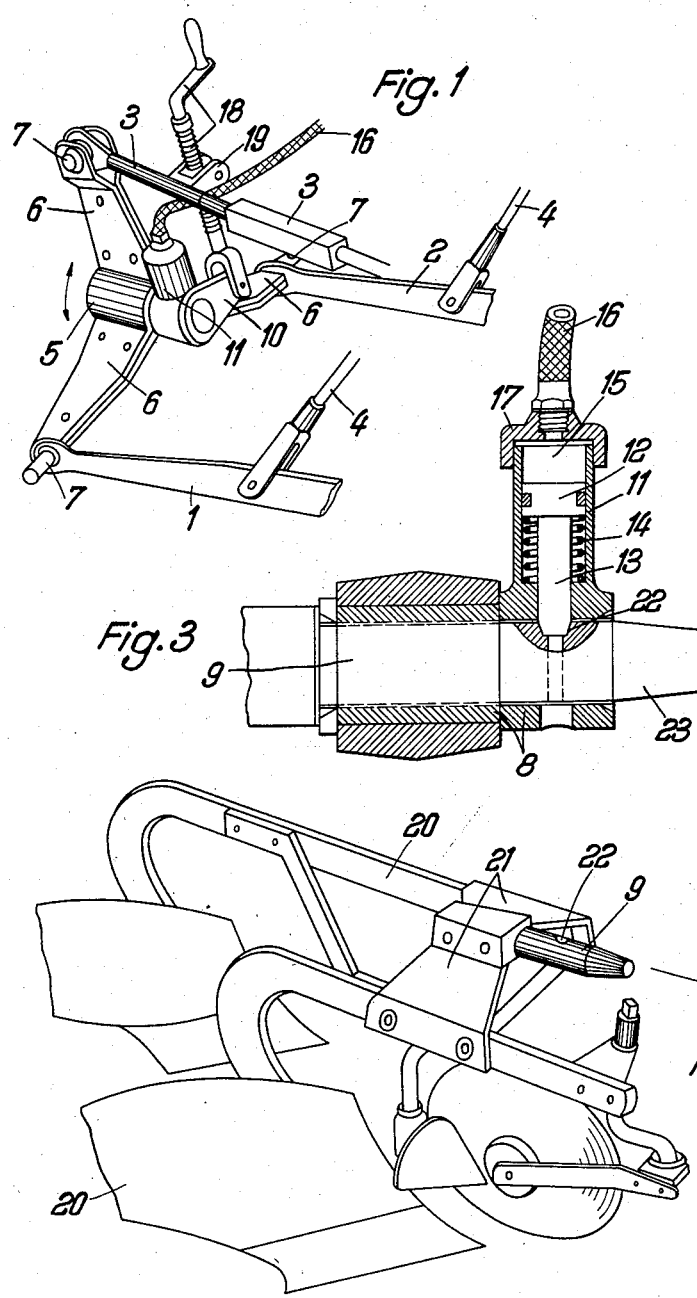
Inventor:
Hermann Wessendorf Sept. 15, 1959 H. WESSENDORF 2,904,116
TRACTOR IMPLEMENT HITCH
Filed May 21, 1956 2 Sheets-Sheet 2

Inventor:
Hermann Wessendorf
By Ernest Montague
Attorney 2,904,116
Patented Sept. 15, 1959

2,904,116

TRACTOR IMPLEMENT HITCH

Hermann Wessendorf, Hannover, Germany; Emmi L. K. W. I. Wessendorf, executrix of said Hermann Wessendorf, deceased, assignor to Hanomag Aktiengesellschaft, Hannover, Germany, a corporation of Germany Application May 21, 1956, Serial No. 586,107

5 Claims. (Cl. 172—275)

The present invention relates to tractors having a hitch for mounted implements.

In agriculture in particular, tools and implements are employed which are attached to the tractor rear end through means of so-called three- or four-point linkages. In all of these arrangements, interchangeability of implements is complicated as well as their securing them against damage.

Mounting of implements is difficult in so far as the implements have to be attached to the link mechanism at three or four points.

To prevent the implements from being damaged during operation, it has already been proposed to provide automatic or break-away couplings, shear pins, or the like. Effectiveness of such devices, however, is small because after the device has been put into operation once, the operator in most cases will replace the safety elements by other parts which no longer function as a safety device.

It is one object of the present invention to provide a new arrangement for a tractor implement hitch which allows for the attachment of implements in a three- or four-point linkage without the necessity for the tractor driver to get off his seat. At the same time safety against breakage during operation is increased.

It is another object of the present invention to provide a tractor implement hitch which can be employed in connection with a three- or four-point linkage and which comprises an intermediate member which is provided with a coupling half cooperating with a second coupling half arranged on the implement.

It is also another object of the present invention to provide a tractor implement hitch which includes an intermediate member which is shaped like a star having three or four points which engage on the links of the three- or four-point linkage, respectively, while the coupling is conveniently arranged in the center part of the star. The intermediate member is designed so as to allow for sufficient clearance for an existing power take-off drive or for any projecting part on the implement. According to the present invention, the coupling is of the central single-pin type, so that the tractor driver can back up the tractor with the coupling to the implement, the height of the coupling being adjusted from the driver's seat. The implement, carrying the male coupling half, is easily received.

To allow for a wide range of adjustment to suit the varying working conditions of the implement, the female coupling half on the intermediate member is journalled in a socket which can be adjusted from the driver's seat and which is preferably rotatable about its longitudinal axis. By turning the socket, the tractor driver can rotate the implement about its longitudinal axis and thus has the possibility to set the implement to any position desired.

The arrangement in accordance with the present invention at the same time allows for the coupling means to be used as a break-away safety device. The tension of a spring accommodated in a cylinder and acting on a locking bolt is variable according to the different resistance of the various implements in the soil. If, for instance, a plow hits an obstacle in the soil, the locking bolt compresses the spring through which action the coupling pin on the implement is released and thus the implement itself uncoupled from the tractor.

With these and other objects in view which will become apparent in the following detailed description, the present invention will be clearly understood in connection with the accompanying drawings, in which:

Figure 1 is a side perspective view of the rear part of a three-point linkage on a tractor;

Fig. 2 is a side perspective view of a mounted plow;

Fig. 3 is a sectional view of the coupling means; and

Figure 4:
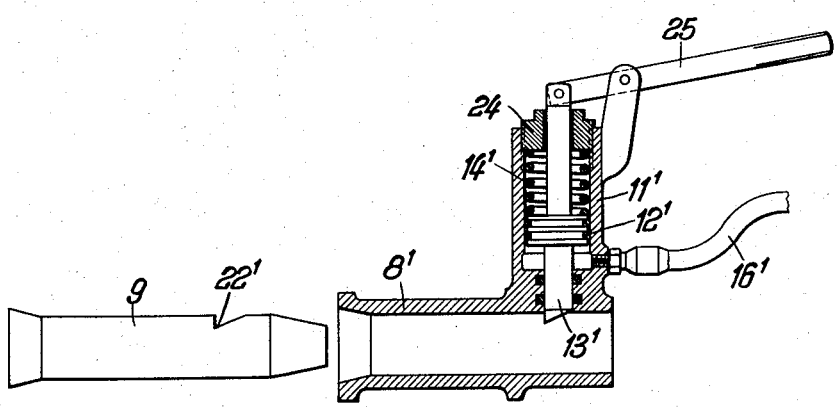
Fig. 4 is a sectional view through another embodiment of the coupling means.

Referring now to the drawings and in particular to Figs. 1 to 3, in a three-point linkage the lower links 1 and 2 and the top link 3 which is variable in its length, are journalled on the tractor's rear end.

The power lift provided on the tractor actuates the linkage through means of the rods 4.

According to the present invention an intermediate member 5, 6 is used which in connection with the three-point linkage is shaped like a star with three points (in a four-point linkage the star has four points) and which engages the links through means of pins 7.

In its center the intermediate member 5, 6 forms a socket for a coupling. In the embodiment illustrated in Figs. 2 and 3, the coupling substantially comprises a bushing 8 which is rotatably journaled on the center piece 5. The bushing 8 receives a coupling pin 9 which will be described later. At the end facing the tractor the bushing 8 is provided with a lever 10 and a hydraulic cylinder 11, accommodating a locking bolt 13 having a piston 12. The outer end of the locking bolt is tapered. The piston 12 is subjected to the action of a compression spring 14 and, on its upper face, to the pressure of hydraulic oil 15 which is supplied by the tractor's hydraulic system through a line 16 and the cap 17, respectively.

Fig. 4 shows another embodiment of the coupling device in which a compression spring 14' is arranged above the piston 12' fixed on the locking bolt 13' and the pressure medium is supplied into the chamber below the piston 12'.

A screwed spindle 18 engages on the lever 10. The spindle 18 is supported in a bracket 19 fixed on the upper link 3. By turning the screwed spindle 18 the bushing 8 can be turned about its longitudinal axis through means of the lever 10.

The crank of the screwed spindle 18 is arranged so that it can be operated from the driver's seat.

To connect an implement with the hitch in accordance with the present invention, the implements must have a coupling pin 9. Fig. 2 shows a plow 20 which on a frame 21 carries the coupling pin 9. It is to be understood that the pin 9 and its mounting, as well as the intermediate member 5, 6 must be strong enough to take all of the plow 20 weight and the stress when the plow is working.

To lock the coupling parts, the bolt 9 has an opening or recess 22. Furthermore, its front part 23 is tapered.

Operation of the device is as follows:

The tractor driver first adjusts the linkage to correct height which is easily done through means of the power lift. He then backs up to the implement until the bushing 8 on the intermediate member 5,6 is able to receive the coupling pin 9 on the implement. As soon as a position, shown in Fig. 3, has been reached, the tractor hydraulic system is actuated to engage the locking pin 13 whereby connection and locking of the implement to the tractor is accomplished.

Now the implement can be lifted and lowered by means of the three-point linkage. When working in a furrow, for instance, the plow 20 can be adjusted to any inclined position through means of the screwed spindle 18.

To disengage the implement, the driver reverses the oil flow and removes the oil pressure from the hydraulic cylinder 11. At this moment, the compression spring 14 forces the locking pin 12, 13 back into its initial position, and the implement is uncoupled.

If the resistance of the implement in the soil becomes greater than the pressure in the line 16 and above the piston 12, the locking bolt 13 is pushed into the cylinder 11.

In the arrangement according to Fig. 4 the spring 14' forces the locking bolt 13' into the groove 22' provided on the coupling pin 9 of the implement. To uncouple the lock at will, the pressure medium is supplied through the line 16' into the chamber below the piston 12', through which action the piston 12' is moved upwards and the compression spring 14' compressed. The bolt 13' leaves the opening or recess 22' and the implement is uncoupled.

It is another advantage of the invention that in case of failure of the hydraulic system of the tractor the locking bolt 13' can be mechanically removed from the groove 22' by means of the actuating linkage 25.

If now, resistance of the implement in the soil becomes greater than the adjusted tension of the spring, the locking bolt 13' slips out of the opening or recess 22' whereby the spring is compressed and the implement uncoupled from the tractor.

It is to be understood that the coupling pin 9 as well as the intermediate member 5, 6 must be designed sturdy enough to take the stress during operation.

Other types of coupling means may be used without necessitating any alteration of the present invention. The new coupling device enables the tractor driver to exchange implements without leaving his seat. The intermediate member 5, 6 with the coupling device is easily attached on any tractor having a three- or four-point linkage system. It is another advantage of the present invention that the implement's overall length is not increased and that existing implements can easily be provided with the device in accordance with the present invention.

Due to the starlike shape of the intermediate member sufficient clearance is provided for the power take-off. Such clearance is particularly advantageous when a projecting plow beam with a disk-colter is used.

While I have disclosed several embodiments of the present invention, it is to be understood that these embodiments are given by example only and not in a limiting sense, the scope of the present invention being determined by the objects and the claims.

I claim:

1. In a device for connecting an implement to a tractor, a link mechanism consisting of a plurality of links and connected with the rear of said tractor, an intermediate member of star design pivoted to the ends of said respective links, a center piece having a bushing disposed substantially in the center of said intermediate member, the latter providing sufficient clearance for a power-take-off drive, and said implement having a forwardly projecting coupling pin, the latter being received in said bushing and having a recess at its periphery, a hydraulic cylinder adapted to be connected with the hydraulic system of said tractor and disposed adjacent said bushing, a spring biased piston carrying a locking bolt having one inclined face at its forward end and reciprocating in said hydraulic cylinder, said forward end of said locking bolt being received in said recess of said coupling pin in the operative, locking position of said locking bolt, and means for releasing said locking bolt from said coupling pin in order to disengage said implement from said tractor.

2. The device, as set forth in claim 1, wherein said piston is moved by hydraulic means into its operative coupling pin-engaging position and released by operation of said spring.

3. The device, as set forth in claim 1, wherein said piston is moved into operative coupling pin-engaging position by said spring and released by hydraulic means.

4. The device, as set forth in claim 1, which includes a hand lever pivotally connected to one end of said piston and pivotally mounted on said hydraulic cylinder, said lever being adapted to lift said piston and said locking bolt manually from the operative coupling pin-engaging position.

5. The device, as set forth in claim 1, wherein said adjusting means are mounted on one of the links and said intermediate member, respectively.

References Cited in the file of this patent
UNITED STATES PATENTS

| | | |
|---|---|---|
| 1,649,980 | Schlagenhauf | Nov. 22, 1927 |
| 2,562,817 | Pettick | July 31, 1951 |
| 2,602,389 | Markel | July 8, 1952 |
| 2,685,453 | Kuhary et al. | Aug. 3, 1954 |
| 2,701,510 | Altgelt | Feb. 8, 1955 |
| 2,702,501 | Simpson | Feb. 22, 1955 |
| 2,752,836 | Pilch | July 3, 1956 |
| 2,762,282 | Mason | Sept. 11, 1956 |